United States Patent
Iimura et al.

(10) Patent No.: US 7,075,762 B2
(45) Date of Patent: Jul. 11, 2006

(54) INVERTER CIRCUIT DEVICE WITH TEMPERATURE DETECTION CIRCUIT

(75) Inventors: Junichi Iimura, Gunma (JP); Katsumi Okawa, Gunma (JP); Yasuhiro Koike, Gunma (JP); Soichi Izutani, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 381 days.

(21) Appl. No.: 10/610,739

(22) Filed: Jun. 30, 2003

(65) Prior Publication Data

US 2004/0008457 A1 Jan. 15, 2004

(30) Foreign Application Priority Data

Jul. 4, 2002 (JP) ............ P.2002-195531

(51) Int. Cl.
*H02H 7/00* (2006.01)
(52) U.S. Cl. ......................................... 361/18
(58) Field of Classification Search ............... 361/18
See application file for complete search history.

(56) References Cited

U.S. PATENT DOCUMENTS 5,280,228 A * 1/1994 Kanouda et al. ............ 318/803
6,284,817 B1 * 9/2001 Cross et al. ................. 523/220

* cited by examiner

*Primary Examiner*—Phuong T. Vu
*Assistant Examiner*—Terrence Willoughby
(74) *Attorney, Agent, or Firm*—Fish & Richardson P.C.

(57) ABSTRACT

In order to enable overheat protection and overcurrent protection as well as temperature detection of an inverter circuit, an inverter circuit comprises a switching circuit 9 composed of a plurality of switching elements and a control circuit 1 for generating a control signal to be inputted into a drive circuit 2 to control a load, a temperature detecting element 12 for detecting a change in temperature of the inverter circuit is provided in a temperature detection circuit 10, and a temperature detection signal which changes according to a change in temperature of said inverter circuit, an overheat abnormal signal outputted upon a rise in temperature to a predetermined temperature or more, and an overcurrent abnormal signal outputted from an overcurrent protection FET 13 are outputted via one commonly used terminal.

3 Claims, 5 Drawing Sheets

| Tc | Rt[Ω] | V (ITRIP)[V] |
|---|---|---|
| 0 | 369,145 | 0.1991 |
| 25 | 100,000 | 0.6646 |
| 50 | 33,159 | 1.5852 |
| 90 | 7,779 | 3.3437 |
| 100 | 5,683 | 3.6808 |
| 110 | 4,221 | 3.9595 |
| 125 | 2,778 | 4.2789 |

INVERTER CIRCUIT DEVICE WITH TEMPERATURE DETECTION CIRCUIT

BACKGROUND OF THE INVENTION

1. Field of the Invention

The present invention relates to an inverter circuit device with a temperature detection circuit which can carry out overheat protection and overcurrent protection.

2. Description of the Prior Art

First, with reference to FIG. 6, operation of an inverter circuit device with a temperature detection circuit and a control circuit thereof will be briefly described.

A reference signal of a frequency according to a rotational speed setting signal is outputted from a control circuit 1 composed of a microcomputer or a DSP to a driver circuit 2. This reference signal is composed of three pulse-width modulated square waves each having a 120 degree phase difference and three square waves phase-delayed with respect to these pulse-width modulated square waves generally by 180 degrees.

The three pulse-width modulated square waves each having a 120 degree phase difference are inputted via the driver circuit 2 into control electrodes of upper arm switching elements Q1, Q2, and Q3 of an inverter circuit, and control ON/OFF of these switching elements.

In addition, pulse-width modulated square waves which are phase-delayed by 180 degrees with respect to these pulse-width modulated square waves similarly control ON/OFF of lower arm switching elements Q4, Q5, and Q6 similarly via the driver circuit 2.

Herein, diodes D1, D2, D3, D4, D5, and D6 connected to the switching elements Q1, Q2, Q3, Q4, Q5, and Q6 are free wheel diodes.

Accordingly, at output terminals of the inverter circuit which are ON/OFF-controlled by three pulse-width modulated square waves each having a 120 degree phase difference and three pulse-width modulated square waves respectively phase-delayed by 180 degrees with respect to these pulse-width modulated square waves, namely, at nodes U, V, and W between the switching elements Q1 and Q4, the switching elements Q2 and Q5, and the switching elements Q3 and Q6, a 3-phase pulse-width modulated sine voltage is obtained, and a load current which approximates a sine wave flows to a motor M.

In the aforementioned inverter circuit, when the rotational speed of the motor M is changed according to the temperature or when the temperature excessively rises, it is necessary to stop the motor M so as not to damage the inverter circuit. Therefore, a temperature detection circuit 3 is provided to detect an abnormal rise in temperature of the inverter circuit, and a detected abnormal heating signal is applied to the control signal 1 so as to stop the above-described motor M.

As a result of a change in temperature of the inverter circuit, in order to apply a temperature detection signal detected by the above-described temperature into the control signal, a dedicated terminal is required in the control circuit, therefore, the number of terminals of the control circuit increases.

In addition, in order to prevent circuit elements from being damaged when the inverter circuit temperature is overheated above a predetermined temperature, it is necessary not merely to control an electric current which flows through a switching circuit, etc., but also to stop the above-described inverter circuit from operating.

Furthermore, as shown in FIG. 7, a thermistor 3a is used to detect a temperature in the above-described temperature detection circuit 3. Priorly, an inverter circuit has been attached to a printed circuit board 4, and the above-described thermistor 3a is provided on a heat sink 5 with the inverter circuit attached. Accordingly, an accurate rise in temperature of the inverter circuit cannot be detected, and moreover, space was required.

SUMMARY OF THE INVENTION

The present invention also makes it possible to carry out overheat protection and overcurrent protection, and the present invention provides an inverter circuit device with a temperature detection circuit comprising: a switching circuit composed of a plurality of switching elements; a drive circuit for driving the switching elements; and a protection circuit which stops driving of the drive circuit and outputs an abnormal signal in regard to an overcurrent abnormality, wherein a temperature detection circuit is provided with a temperature detecting element to detect a change in temperature of the inverter circuit, and an output of a temperature detection signal which changes according to a change in temperature of the inverter circuit is held by a terminal to output an abnormal signal from the protection circuit in common.

The present invention provides an inverter circuit device with a temperature detection circuit comprising: a switching circuit composed of a plurality of switching elements; a drive circuit for driving the switching elements; and a protection circuit which stops driving of the drive circuit and outputs an abnormal signal in regard to an overcurrent abnormality, wherein a temperature detection signal which changes according to a change in temperature of the inverter circuit is applied to a control circuit to change an electric current which flows through the inverter circuit according to the change in temperature, and an overheat abnormal signal from an overheat detection circuit is applied, when the inverter circuit rises to a predetermined temperature or more, to the control circuit and drive circuit to stop operation of the inverter circuit.

According to the present invention, the temperature detecting element and overcurrent detecting element of the temperature detection circuit are connected, and detected signals are applied to the same terminal of the control circuit, therefore, temperature control and overcurrent detection can be carried out without separately providing a terminal or a circuit in the control circuit.

In addition, since the overcurrent protection signal detection circuit is connected to the temperature detection circuit, operation is stopped when the circuit rises in temperature to a predetermined temperature or more, whereby the circuit is protected from breaking as a result of overheating.

Furthermore, as the circuit, since a switching circuit and a drive circuit are attached to the heat sink print board, by making use of a characteristic wherein the substrate temperature becomes almost uniform owing to its excellent heat conductivity, a change in temperature of the switching circuit can be accurately detected by the thermistor, therefore, an electric current supplied to the load can be controlled according to a change in temperature.

DESCRIPTION OF THE PREFERRED EMBODIMENTS

Figure 1:
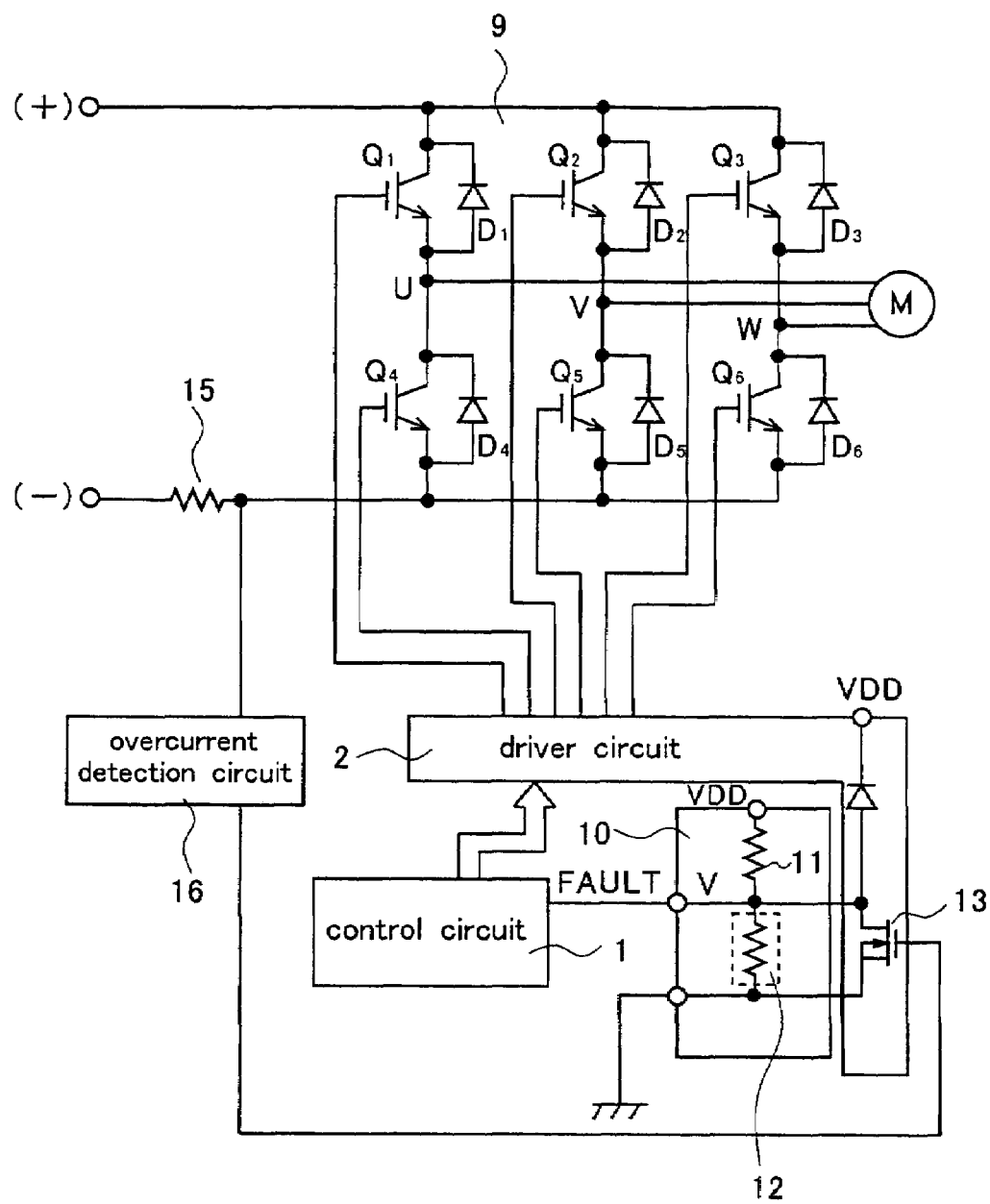
FIG. 1 is a block diagram for explaining an inverter circuit device with a temperature detection circuit according to the present invention.

FIG. 1 shows a block diagram of an inverter circuit device with a temperature detection circuit according to the present invention.

An inverter circuit of the present invention comprises: a switching circuit 9 composed of upper arm switching elements Q1, Q2, and Q3 and lower arm switching elements Q4, Q5, and Q6; a driver circuit 2 for inputting into a control electrode of each switching element to control ON/OFF of the same switching element; and a control circuit 1 for inputting into this driver circuit 2 to generate a control signal.

A load such as a motor M is connected to nodes U, V, and W between the switching elements Q1 and Q4, the switching elements Q2 and Q5, and the switching elements Q3 and Q6 of the switching circuit 9. From the control circuit 1, as mentioned above, pulse-width modulated square waves are outputted to the drive circuit 2, whereby the switching circuit 9 is controlled.

The present invention is characterized in that a temperature detection circuit 10 is connected to the control circuit 1. The temperature detection circuit 10 is for detecting a change in temperature of the inverter circuit composed of the control circuit 1, driver circuit 2, and switching circuit 9, and this is composed of a resistor 11 connected to a power supply VDD and a thermistor 12 whose one end is connected to the resistor 11 and which is connected to a FAULT terminal of the control circuit 1.

A drain/source electrode of an overcurrent protection FET 13 is connected in parallel with the thermistor 12. A drain electrode of the overcurrent protection FET 13 is connected to the power supply VDD via a diode 14 and is, together with one end of the thermistor 12, connected as a FAULT terminal to the control circuit 1.

In addition, a gate electrode of the overcurrent protection FET 13 is connected to an overcurrent detection circuit 16 for detecting an overcurrent which flows to a resistor 15. Although the overcurrent protection FET 13 is incorporated in the driver circuit 2, this may be provided in the temperature detection circuit 10.

Figures 2, 3:
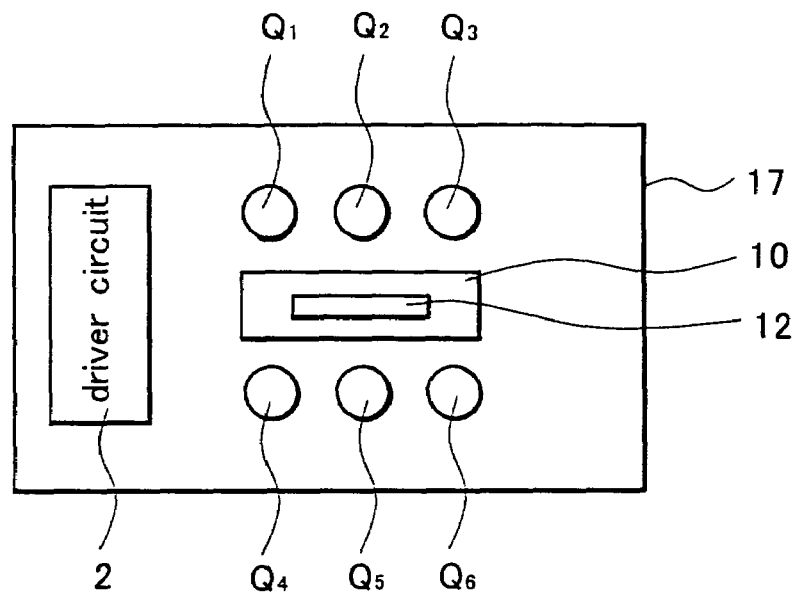
FIG. 2 is a view showing a model wherein a temperature detection circuit according to the present invention is attached to a heat sink print board.
FIG. 3 is a table showing temperatures, resistance values, and voltages of a thermistor employed in an inverter circuit device with a temperature detection circuit according to the present invention.

FIG. 2 is an attachment view wherein a temperature detection circuit 10 used in an inverter circuit device with a temperature detection circuit is attached to a heat sink print board 17. As the heat sink print board 17, an aluminum substrate whose surface is oxidized and insulated is used.

On the surface of the insulated heat sink print board 17, printed wiring is provided and upper arm switching elements Q1, Q2, and Q3 and lower arm switching elements Q4, Q5, and Q6 of the switching circuit 9 and a driver circuit 2, etc., are attached.

The thermistor 12 is desirably attached as proximate as possible to the switching circuit 9 and driver circuit 2 on the heat sink print board, which rise in temperature in operation. However, in the present invention, since aluminum is used for the substrate material, the substrate temperature becomes almost uniform owing to its excellent heat conductivity, therefore, temperature of the inverter circuit can be accurately detected irrespective of its position as long as it is mounted within the substrate.

Three pulse-width modulated square waves outputted from the control circuit 1 and each having a 120 degree phase difference are inputted via the driver circuit 2 into control electrodes of the upper arm switching elements Q1, Q2, and Q3 of the inverter circuit 9, and control ON/OFF of these switching elements.

In addition, pulse-width modulated square waves which are phase-delayed with respect to the above pulse-width modulated square waves by 180 degrees from the control circuit similarly control ON/OFF of the lower arm switching elements Q4, Q5, and Q6 via the driver circuit 2.

Accordingly, to output terminals of the switching circuit 9, which is ON/OFF controlled by three pulse-width modulated square waves each having a 120 degree phase difference and three pulse-width modulated square waves which are phase-delayed with respect to these pulse-width modulated square waves by 180 degrees, namely, to the nodes U, V, and W between the switching elements Q1 and Q4, the switching elements Q2 and Q5, and the switching elements Q3 and Q6, a 3-phase pulse-width modulated voltage is applied, whereby a load current is supplied to the motor M to rotate this motor M.

When the motor M is rotated and the switching elements Q1, Q2, Q3, Q4, Q5, and Q6 and the D1, D2, D3, D4, D5, and D6, etc., rise in temperature, the heat sink print board 17 also immediately rises in temperature by a heat transmission. As shown in FIG. 3, when the heat sink print board 17 rises in temperature, a resistance value of the thermistor 12, which is 100KΩ at 25° C., declines to approximately 2.8KΩ at 125° C.

Figure 4:
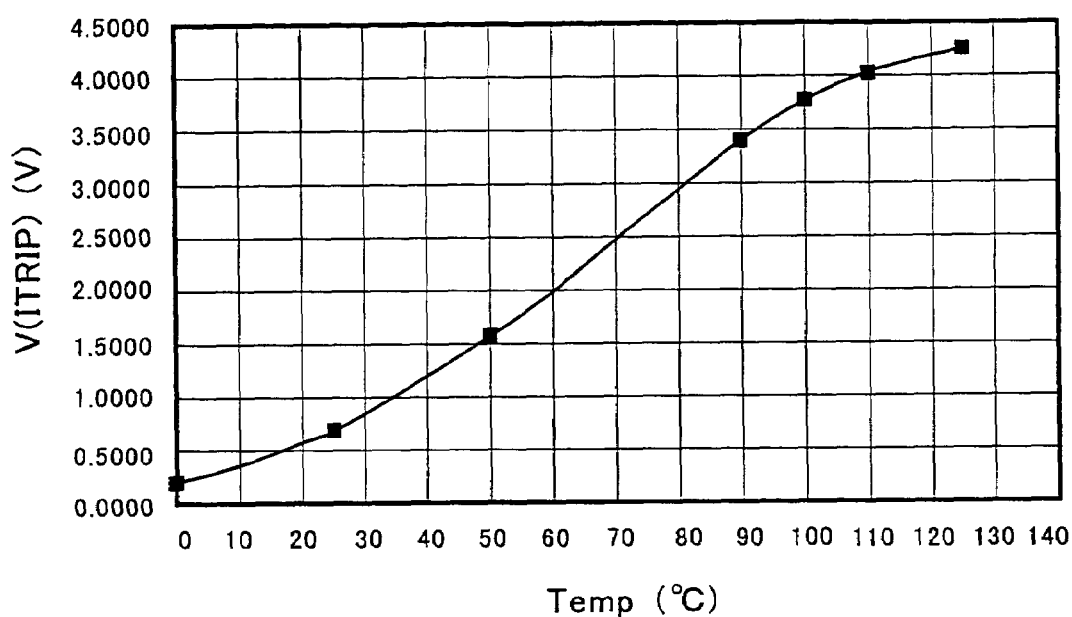
FIG. 4 is a characteristics diagram showing a relationship between the temperature and voltage of a thermistor employed in an inverter circuit device with a temperature detection circuit according to the present invention.
Figure 5:
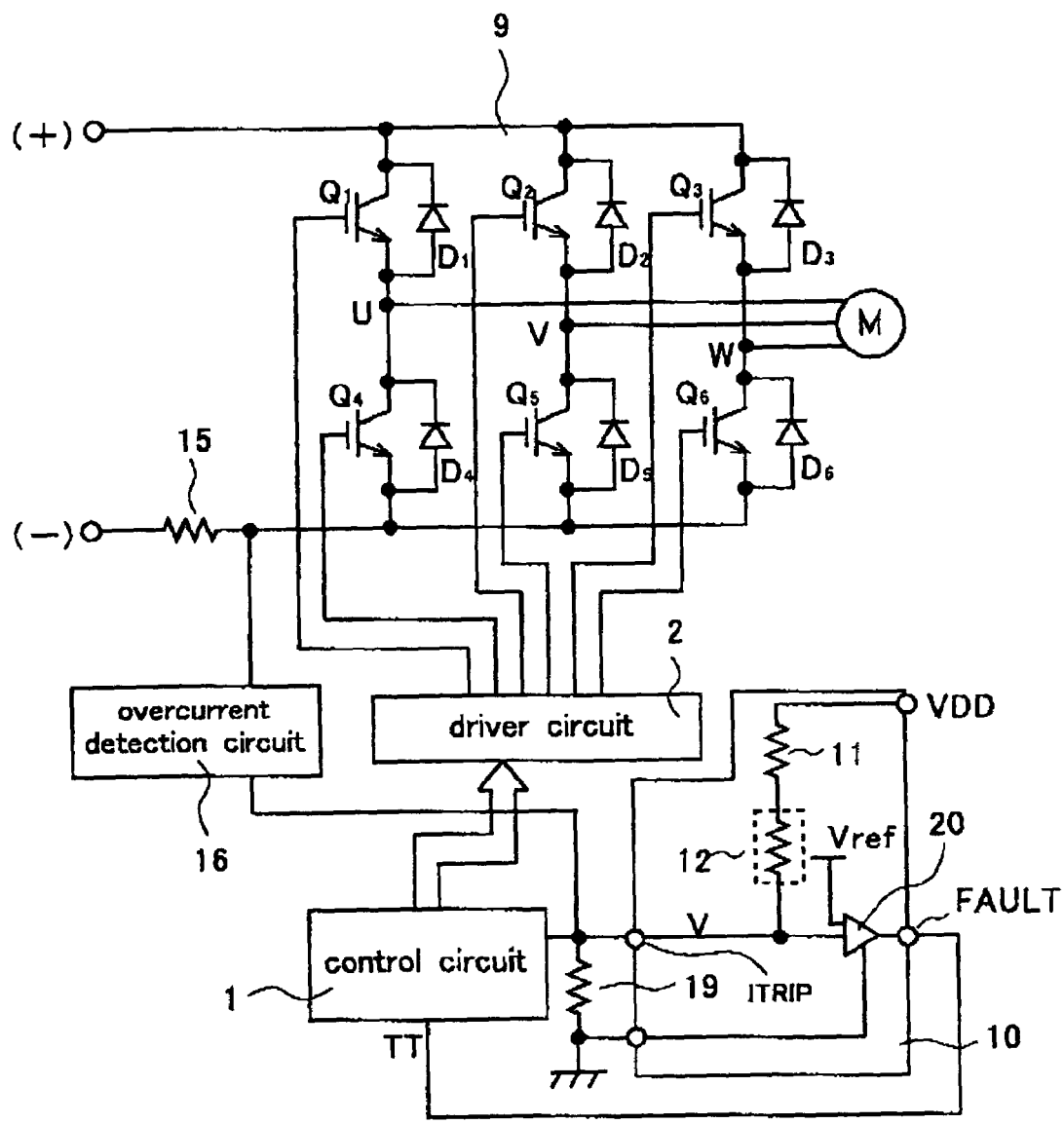
FIG. 5 is a block diagram showing another embodiment of an inverter circuit device with a temperature detection circuit according to the present invention.
Figure 6:
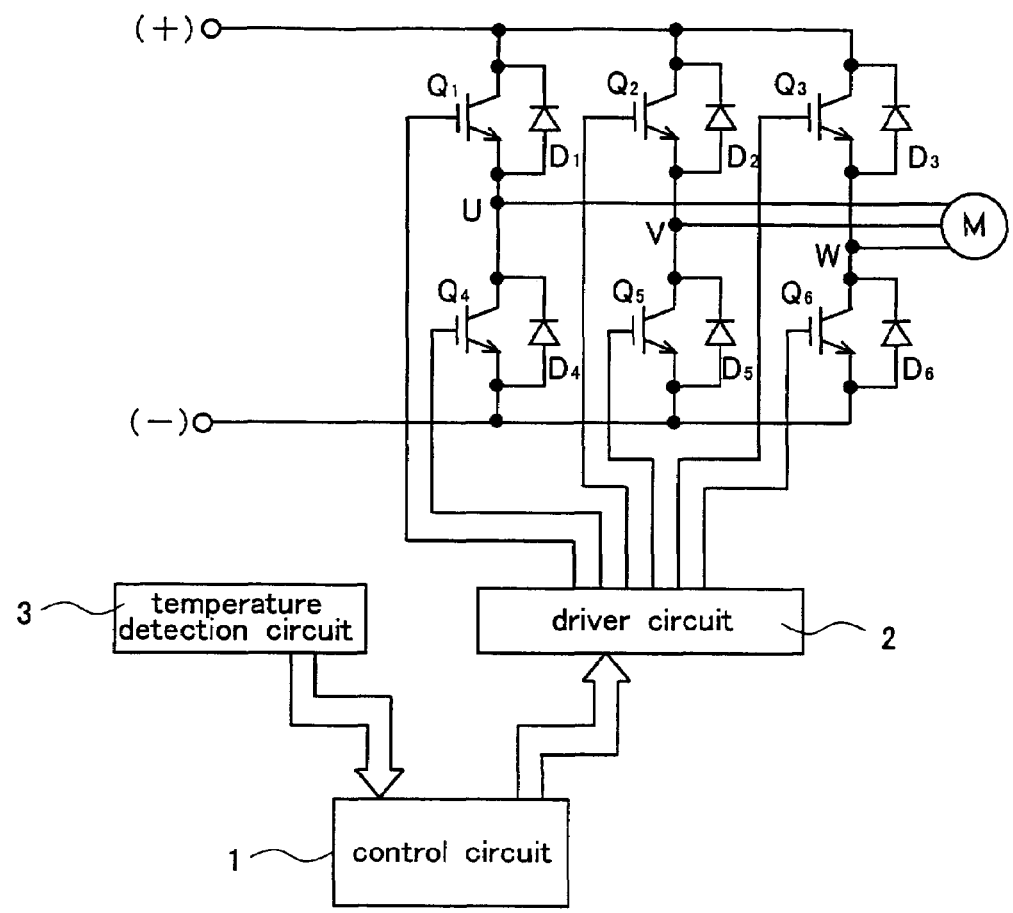
FIG. 6 is a block diagram for explaining a conventional inverter circuit.
Figure 7:
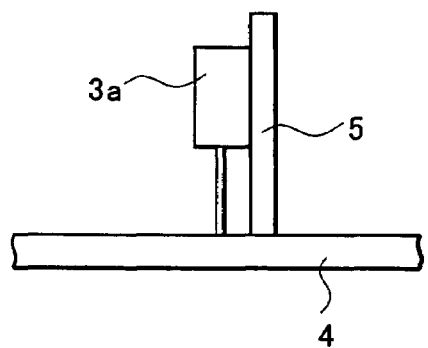
FIG. 7 is a view showing a model wherein a temperature detecting circuit is attached to a conventional inverter circuit.

Accordingly, in the circuit shown in FIG. 5, when a resistance value of the resistor 11 is provided as 10KΩ, a resistance value of the resistor 19 is provided as 5.1KΩ, and a power-supply voltage VDD is provided as 15V, as shown in FIG. 3 and FIG. 4, a temperature detecting signal V (ITRIP) of the thermistor 12, which was approximately 0.7V at 25° C., changes at 125° C. to approximately 4.3V.

This temperature detection signal thus changed is added to the control circuit 1 through a FAULT terminal, pulse-width modulated square waves are controlled by the control circuit 1, a motor electric current according to a change in temperature is supplied to the motor M, whereby the number of revolutions can be changed.

In addition, as shown in FIG. 3 and FIG. 4, as the heat sink print board 17 rises in temperature (Tc), when a V (ITRIP) voltage rises, the comparator 20 is reversed if the voltage exceeds a set Vref voltage, and the FAULT terminal becomes an Lo level. When the FAULT terminal becomes an Lo level, the control circuit 1 judges that an abnormality has occurred, stops driving of the drive circuit 2, and interrupts pulse-width modulated square waves generated from the control circuit 1, whereby motor operation is stopped to prevent the switching elements from breaking due to heating.

On the other hand, owing to a lock of the motor M, etc., when an overcurrent flows to the driver circuit 2 and switching circuit 9, an electric current which flows to the resistor 15 is increased. When the electric current to the resistor 15 becomes the set value or more, an overcurrent detection signal is detected by the overcurrent detection circuit 16. In FIG. 1, an overcurrent detection signal detected by the overcurrent detection circuit 16 is applied to the gate electrode of the overcurrent protection FET 13. Thereby, the overcurrent protection FET 13 is turned on and the FAULT terminal becomes an Lo level.

An overcurrent abnormal signal resulting in turning on of the overcurrent protection FET 13 and an Lo level is outputted, and at this time, the abnormal signal is transmitted to the control circuit 1 through the FAULT terminal which is the same as that for outputting the temperature detecting signal. Then, the pulse-width modulated square waves generated from the control circuit 1 are interrupted, whereby operation of the motor M is stopped to prevent overcurrent breaking of the switching elements and motor failure.

A detailed description will be given by use of FIG. 5 in a case where an overcurrent protection can be carried out by interrupting current to the motor M when the temperature of the heat sink print board of the inverter circuit device becomes a certain set temperature or more. A comparator 20 for overcurrent detection is provided in the temperature detection circuit 10, to one input terminal of this comparator 20, the thermistor 12 is connected, and to the other terminal, a reference voltage Vref is applied.

Similar to the foregoing, when the inverter circuit device rises in temperature, the resistance value of the thermistor 12 declines, and a temperature detection signal is detected. The temperature detection signal is applied through the ITRIP terminal to the control circuit and is the same in terms of functions to control pulse-width modulated square waves outputted from this control circuit 1, make a motor electric current according to a change in temperature flow to the motor M, and change the number of revolutions according to the temperature.

However, as shown in the aforementioned FIG. 4, in the present circuit, when the temperature becomes a certain temperature or more and the temperature detection signal V (ITRIP) detected by the thermistor 12 and applied to one terminal of the comparator 20 becomes a reference voltage Vref or more, an overcurrent abnormal signal TT is generated from the output terminal of the comparator 20.

When the overcurrent abnormal signal TT is applied to the control circuit 1, pulse-width modulated square waves generated from the control circuit 1 are interrupted, whereby operation of the motor M is stopped to prevent overcurrent breaking of the switching elements and motor failure.

Moreover, by connecting the overcurrent detection circuit 16 to the resistor 15, to which an overcurrent flows, and applying an overcurrent detection signal, which is detected by the overcurrent detection circuit 16, to one end of the resistor 19, similar to FIG. 1, an overcurrent and overheat protection can be carried out with the same terminal.

What is claimed is:

1. An inverter circuit device with a temperature detection circuit comprising:
    a switching circuit composed of a plurality of switching elements;
    a drive circuit for driving said switching elements; and
    a protection circuit to stop driving of said drive circuit and output an abnormal signal in regard to an overcurrent abnormality, wherein
    a temperature detection circuit with a temperature detecting element for detecting a change in temperature of said inverter circuit is provided, a temperature detection signal which changes according to a change in temperature of said inverter circuit is applied to a control circuit to change an electric current which flows through the inverter circuit according to a change in temperature during operation of said inverter circuit, and an overheat abnormal signal which is generated from an overheat detection circuit when said inverter circuit is made a predetermined temperature or more is applied to said control circuit to stop operation of the inverter circuit.

2. The inverter circuit device with a temperature detection circuit as set forth in claim 1, wherein
    said inverter circuit and temperature detecting element are attached to the same heat sink print board.

3. The inverter circuit device with a temperature detection circuit as set forth in claim 2, wherein
    said heat sink print board is an aluminum substrate on whose surface an oxide film is formed.

* * * * *